United States Patent
Mollfulleda San Julian et al.

(10) Patent No.: US 8,750,446 B2
(45) Date of Patent: Jun. 10, 2014

(54) OFDM FRAME SYNCHRONISATION METHOD AND SYSTEM

(75) Inventors: Antonio Mollfulleda San Julian, Badalona (ES); Jose Abad Molina, Rincón de la Victoria (ES)

(73) Assignee: Broadcom Corporation, Irvine, CA (US)

( * ) Notice: Subject to any disclaimer, the term of this patent is extended or adjusted under 35 U.S.C. 154(b) by 410 days.

(21) Appl. No.: 13/056,652

(22) PCT Filed: Aug. 1, 2008

(86) PCT No.: PCT/EP2008/060186
§ 371 (c)(1),
(2), (4) Date: Jun. 15, 2011

(87) PCT Pub. No.: WO2010/012313
PCT Pub. Date: Feb. 4, 2010

(65) Prior Publication Data
US 2011/0249780 A1    Oct. 13, 2011

(51) Int. Cl.
*H04L 7/00*    (2006.01)
(52) U.S. Cl.
USPC .......................................................... 375/365

(58) Field of Classification Search
USPC .................................. 375/260, 364, 365, 368
See application file for complete search history.

(56) References Cited

U.S. PATENT DOCUMENTS

| | | | |
|---|---|---|---|
| 2004/0170237 A1* | 9/2004 | Chadha et al. | 375/343 |
| 2005/0128938 A1 | 6/2005 | Fang et al. | |
| 2008/0043858 A1* | 2/2008 | Lim et al. | 375/260 |
| 2008/0107194 A1* | 5/2008 | Cho et al. | 375/260 |

OTHER PUBLICATIONS

PCT/EP2008/060186 International Search Report and Written Opinion Feb. 24, 2009.
Supplement to IEEE Standard for Information Technology—Telecommunications and Information Exchange Between Systems—Specific Requirements, Part II: Wireless LAN Medium Access Control (MAC) and Physical Layer (PHY) Specifications: High-Speed Physical Layer in IEEE STD 802.11A-1999, XX, XX, Dec. 30, 1999, pp. 1-90 XP002189725.

* cited by examiner

*Primary Examiner* — Kevin Kim
(74) *Attorney, Agent, or Firm* — Garlick & Markison; Bruce E. Garlick

(57) ABSTRACT

An OFDM frame synchronisation method in which the symbols of the preamble carry a code. The detection of the code allows the frame synchronization in presence of low SNR.

20 Claims, 4 Drawing Sheets

OFDM FRAME SYNCHRONISATION METHOD AND SYSTEM

This application claims the benefit of PCT Application PCT/EP2008/060186 filed Aug. 1, 2008 and entitled "OFDM Frame Synchronisation Method and System."

FIELD OF THE INVENTION

The present invention relates to a method, system and computer program for OFDM synchronisation; and more particularly, OFDM frame synchronisation.

BACKGROUND OF THE INVENTION

Orthogonal Frequency Division Multiplexing (OFDM) subdivides a high data rate input data stream into a number of parallel sub-streams of reduced data rate wherein each sub-stream is modulated and simultaneously transmitted on a separate orthogonal sub-carrier. Referring to FIG. 1, an OFDM transmitter 10 comprises a symbol mapper 16 which groups incoming serial data 14 to form symbols. The symbols are modulated with baseband subcarriers by an inverse DFT 18 and then serialized to form provisional OFDM symbols. A cyclic prefix is formed from a few samples selected from the end of a provisional OFDM symbol. The cyclic prefix is concatenated to the start of the corresponding provisional OFDM symbol. The cyclic prefix and the provisional OFDM symbol, collectively form an OFDM symbol, wherein the cyclic prefix forms the start of the OFDM symbol; and the provisional OFDM symbol forms the rest. The OFDM symbols are then transferred to a DAC 20 in which they are converted to analog form.

Prior to transmitting a first OFDM symbol, the transmitter 10 transmits a special signal, known as a preamble, which is used for synchronization purposes. Thus, an OFDM frame comprises a preamble signal followed by a plurality of OFDM symbols. On receipt of an OFDM frame, an OFDM receiver 24 performs the inverse operations of the OFDM transmitter 10 in reverse order. However, before any receiver algorithms can be employed, the system clock of the receiver 24 must be synchronised with that of the transmitter 10. Symbol timing refers to the process of finding the precise moment when individual OFDM symbols start and end. This moment is used to position the DFT window (i.e. the set of samples used to calculate the DFT of each received OFDM symbol) of the receiver, and thereby demodulate the subcarriers of the received OFDM symbol. Whilst upper layer OFDM protocols (e.g. OFDM Medium Access Control (MAC) policies) provide some rough guidance as to the start of an OFDM symbol, they do not provide an exact indication thereof. In addition, the MAC protocols in a receiver can only operate if the received OFDM symbols have been previously synchronized and decoded; since the synchronization mechanisms at MAC level are more focused on tracking variations in a reference clock signal.

Traditional synchronization approaches rely on the detection of preambles. Referring to FIG. 2, a preamble comprises short OFDM symbols (or preamble symbols) 30, which are used only in the preamble signal. In particular, the preamble only comprises a set of samples obtained from the output of a short IFFT; and does not comprise a cyclic prefix. Preamble symbols are typically shorter than the OFDM symbols used in the rest of an OFDM frame. The use of short preamble symbols minimizes the overhead (on overall transmission efficiency) of transmitting the preamble; and enables simplified implementation of the preamble. The problem of symbol synchronization can be divided into two steps, namely:

- timing synchronisation, which involves determining the time shift between transmitted preamble symbols and the receiver DFT window; and
- frame synchronisation, which involves determining the start point of the payload (or the last symbol in the preamble) of a received OFDM signal.

Timing synchronization may be achieved by signal correlation in the time domain (T. M. Schmidl and D.C. Cox, *IEEE Trans. On Commun.*, 1997 (45), 1613-1621) or phase correlation in the frequency domain (i.e. after the DFT operation of the receiver). Phase correlation involves determining the phase shift between the training DFT and the preamble symbols from a cross-correlation peak. The shift can be represented by an angular rotation, wherein the size of the angle provides an indication of the extent of the shift. Phase correlation provides better performance in the presence strong of narrowband-band interferences. In particular, since preamble symbols remain the same during timing synchronization, averaging several symbols allows the DFT window to be aligned even for signals with lower valued (negative) signal to noise ratios (SNR). Once timing synchronization is achieved, the receiver's DFT window is assumed to be aligned with individual preamble symbols.

Frame synchronization successively correlates consecutive preamble symbols to detect the last preamble symbol, wherein at least one of the last preamble symbols is usually sign inverted. This form of correlation can be performed in time domain, (i.e. before the DFT), or in frequency domain (i.e. after the DFT). The correlation process is based on the observation that if two consecutive preamble symbols are exactly the same, a maximum value of correlation is achieved. However, if the symbols are sign inverted, a minimum value of correlation is achieved. Thus, in use, the correlation output is inspected to find abrupt changes therein. However, when the signal is highly corrupted by noise causing negative values of signal to noise ratios (SNR), preamble symbols cannot be processed in this fashion, because the position of the sign inverted symbol is lost (K. Shi, E. Serpedin, *IEEE Trans. On Commun.*, 2004, 3(4), 1271-1284).

A repetitive structure has been included in a preamble by the IEEE802.11a/HyperLAN-II standard (IEEE P802.11a "Part 11: Wireless LAN Medium Access Control (MAC) and Physical Layer (PHY) Specifications: High Speed Physical Layer in the 5 GHz Band", July 1999 and ETSI DTS/BRAN 030003-1, "Broadband Radio Access Networks (BRAN); HYPERLAN Type 2 Functional Specifications. Part I-Physical (PHY) layer", June 1999). More particularly, these standards employ a series of short symbols (S) followed by two long symbols (L) to form a preamble such as [S S S S S S S S L L]. WLAN (IEEE802.11a) defines a short symbol as an output of a short FFT (i.e. with a smaller number of points than the FFT used for data symbols) but not comprising a cyclic prefix. Similarly, a long symbol is defined as the output of the same FFT as that used on data symbols, but not comprising a cyclic prefix. Both the long symbols are short symbols are fixed in accordance with the standards.

The long and short symbols are used for fine time/frequency synchronization and for channel estimation. More particularly, the short symbols are used for timing alignment and the long symbols are used for frame synchronization. However, HiperLAN has been designed to work with signals of positive SNR; and it is very difficult to use this approach for synchronizing with signals of lower SNR values because the reliability of the synchronization is highly deteriorated (i.e. there is a very high probability of not correctly synchronizing). Similarly, the HomePlug-AV system (HomePlug PowerLine Alliance, "HomePlug AV baseline specification", Version 1.1, May. 2007) employs a preamble of the form [S S S S S S S S –S S].

In this case, frame synchronization is achieved by looking for the negative symbol in the preamble. However, these approaches have been designed to work with signals of positive SNR; and are very difficult to use for synchronizing with signals of lower SNR values.

SUMMARY OF THE INVENTION

According to the invention there is provided an OFDM frame synchronisation method comprising the steps of:
(a) receiving a transmitted OFDM frame which includes a preamble comprising a pre-defined, number of preamble symbols arranged to form a known preamble code-word;
(b) cross-correlating successive pairs of symbols in the received frame to produce a cross-correlation output;
(c) selecting from a plurality of predefined code-words, the codeword which most closely matches a selected number cross-correlation values from the cross-correlation output;
(d) comparing the selected code-word against the preamble code-word;
(e) deciding that synchronisation has been achieved in the event the selected code-word substantially matches the preamble code-word; and
(f) performing, in the event the selected code-word does not substantially match the preamble code-word, the steps of:
  acquiring an additional symbol;
  cross-correlating the additional symbol with the immediately preceding received symbol to produce a further cross-correlation value;
  concatenating the further cross-correlation value to the cross-correlation output;
  removing the opposing cross-correlation value from the cross-correlation output; and
  repeating steps (c) to (f) until a predefined stopping criterion is achieved.

Advantages of the Invention

Error correcting codes are currently used in channel coding, to reduce the bit error rate in data communications. In contrast, the present invention uses error-correcting codes for synchronization. In particular, the present invention uses error-correcting codes to compensate for errors in a received synchronization pattern.

A particular advantageous aspect of the invention is its use of short symbols in the preamble used for synchronisation. In particular, whilst it is possible to use longer symbols in the preamble (which would make it more robust to lower SNR signals), nonetheless, this approach has some disadvantages. In particular, longer preamble signals are produced, which increases the overhead of the synchronisation process, on the overall transmission efficiency of the communication system. Furthermore, timing synchronisation becomes considerably more complex. Similarly, whilst averaging can be used to obtain simpler timing synchronisation and robustness to lower SNR signals, nonetheless, averaging cannot be used for frame synchronisation (because whilst averaging improves the SNR, it looses the timing reference needed to perform frame synchronization).

In contrast, the present invention is capable of making frame synchronization robust to lower SNR values whilst using shorter symbols. Furthermore, the present invention makes it possible to improve frame synchronization reliability without using symbol averaging. In particular, the present invention exploits error-correcting codes for frame synchronization.

BRIEF DESCRIPTION OF THE DRAWINGS

An embodiment of the invention is herein described by way of example only with reference to the accompanying Figures, in which.

DETAILED DESCRIPTION

Figure 1:
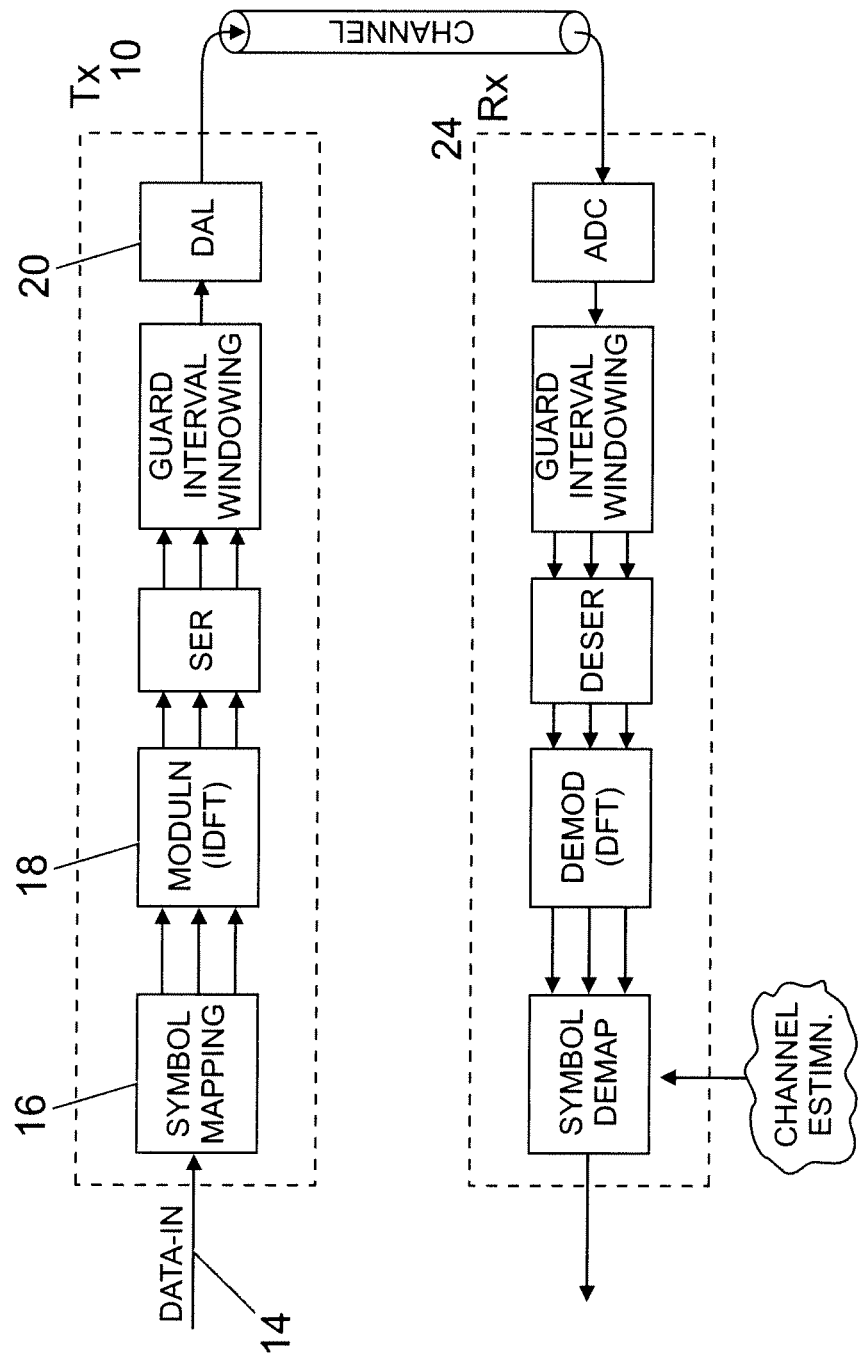
FIG. 1 is a block diagram of an OFDM transmitter in communication with an OFDM receiver.
Figure 2:
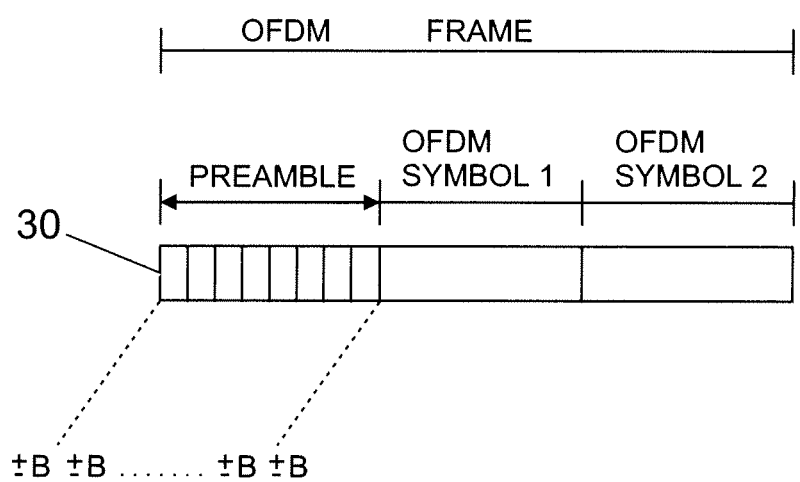
FIG. 2 is a block diagram of a preamble in an OFDM stream.
Figure 3:
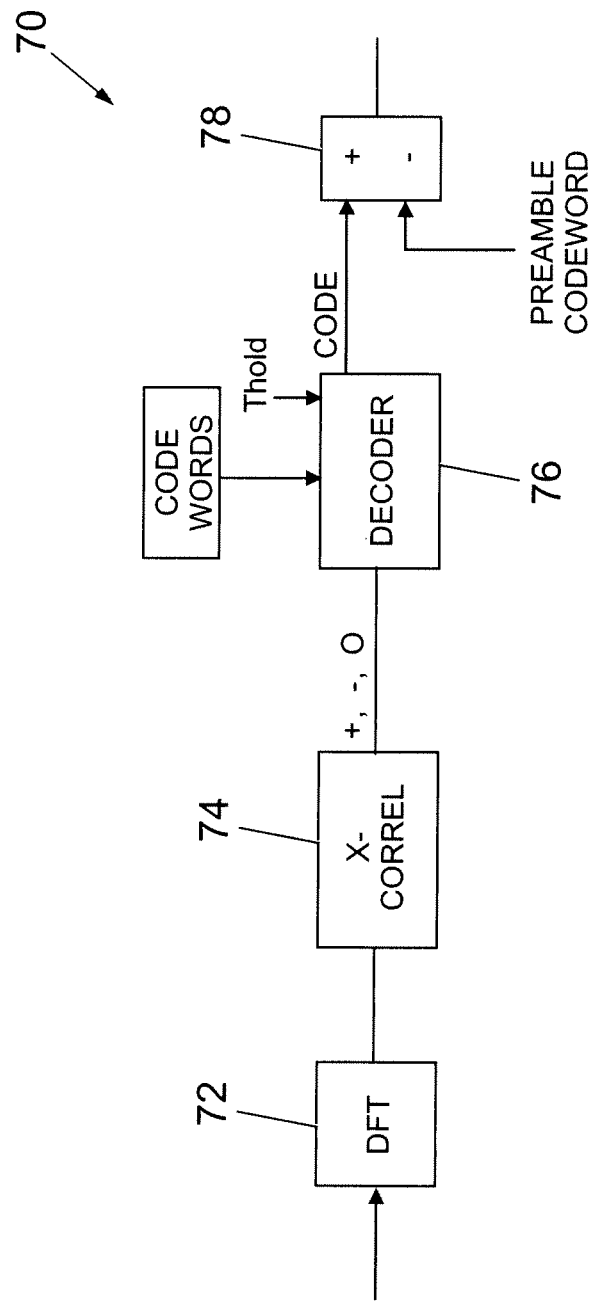
FIG. 3 is a block diagram of the system of the preferred embodiment.

In common with some of the prior art methods, the preferred embodiment performs frame synchronization by correlating consecutive symbols in a received preamble. However, the preferred embodiment then converts the resulting cross-correlation values into a binary sequence. More particularly, the preferred embodiment converts a maximum value of correlation into a value of '1'; and a minimum value of the correlation into a value of '−1'. As discussed above, when an OFDM signal is corrupted by noise, the cross-correlation output can be any value between the maximum and the minimum. In this case, a threshold for determining whether to convert a given cross-correlation value to a binary '1' or a binary '0' is set in the mid point between the maximum and minimum values. Alternatively, it is also possible to define two thresholds, so that some numbers whose values are close to zero will not have a bit assigned thereto (in which case, the value of the bits is unknown for the decoder). Moreover, the system may use a soft-decoding process using the cross-correlation output values themselves as input of the decoder.

In parallel with (and support of) the above process, the preferred embodiment embeds a pre-defined error-correcting code in the preamble. In particular, the preferred embodiment replaces the preamble of a traditional OFDM frame with a coding preamble composed of a set of preamble symbols whose signs are defined so that the binary sequence resulting from the above-described process (of converting the output of the cross-correlation process into a binary form) is a codeword of an error correcting code. In the event a received signal is very noisy, the output of the correlation process is highly deteriorated; and the binary sequence obtained therefrom corrupted. However, the inclusion of the known error correcting code in the originally transmitted preamble, enables the corrupted bits to be detected and corrected. Furthermore, once the complete error correcting code is received, frame synchronization is achieved.

More particularly, the preferred embodiment employs a preamble that is divided into two parts. The first part comprises a plurality of short symbols of the same sign (i.e. [S S S S S . . . S]). The second part of the preamble comprises a predefined number (N) of short symbols, whose signs are determined by a sequence of bits [a(0) a(1) . . . a(N−1)] where a(i) can be +1 or −1. In other words, the second part of the code-word comprises the symbols [a(0)·S a(1)·S a(2)·S, . . . , a(N−1)·S].

The sequence of bits a(i) is established using the following mechanism:— selecting a codeword of length N from a set of codewords of a given error correcting code, wherein the bits of the selected codeword are denoted as [b(0) b(1) . . . b(N)] and a given bit b(i) can take the value +1 or −1;

setting the first symbol a(0) in the second part of the preamble to match the first bit in the selected code word (i.e. setting a(0)=b(0)); and setting the rest of the symbols a(i) in accordance with the recursive expression a(i)=b(i)*a(i−1) for i=1, 2, . . . , N−1.

Thus, the signs of the short symbols in the second part of the preamble are effectively set so that repeated cross-correlations of successive pairs of the short symbols produces the selected codeword. It will be understood that cyclic codes are particularly useful in the preferred embodiment, since one of the main properties of cyclic codes is that a circular shift of a codeword is also a codeword. Nonetheless, it will be appreciated that the preferred embodiment is not limited to cyclic codes, but could instead use other types of codes.

Figure 4:
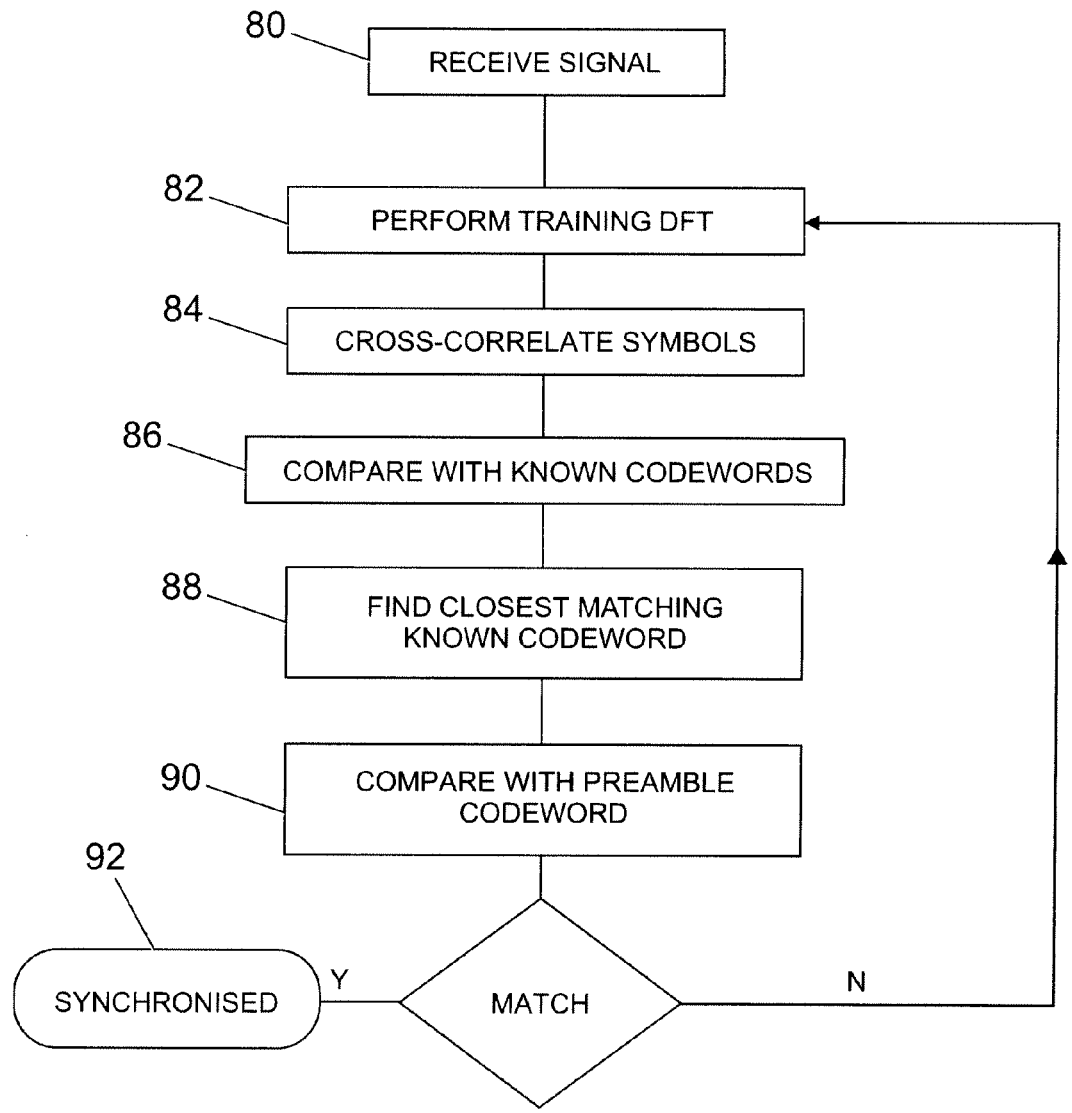
FIG. 4 is a flow chart of the method of the preferred embodiment.

Referring to FIG. 4, a receiver 70 of the preferred embodiment comprises a DFT module 72 which successively applies training DFTs to an incoming signal. The symbols from the successive DFT operations are transmitted to a cross-correlation module 74, which calculates the cross-correlations between the symbols. In particular, the cross-correlation module 74 outputs a positive maximal value (e.g. +1) to indicate two perfectly matching consecutive symbols, a zero to indicate uncorrelated symbols (i.e. noise) and a negative minimal value (e.g. −1) to indicate two matching consecutive symbols of opposite sign.

The outputs from the cross correlation module 74 are transmitted to a decoder 76, which may employ any type of decoding process (including hard and soft decoding). The decoder 76 calculates the Hamming distance (or other distance metric) between the output from the cross-correlation module 74 and a set of known codewords (of known, fixed Hamming distance apart). In particular, the decoder 76 matches the output from the cross-correlation module 74 with the most similar of its codewords; and outputs the relevant matching codeword. This approach is adopted in realisation that the codeword with which a preamble was transmitted may have been distorted by noise etc. on the channel. Thus, the decoder 76 effectively attempts to correct for this distortion. The output codeword is transmitted to a decision module 78 where the output codeword is compared with the known preamble codeword. If the output codeword matches the preamble code-word, synchronisation is judged to have occurred. Otherwise, a training DFT is applied to the next incoming signal and the process repeated until synchronisation is achieved.

More particularly and referring to FIG. 4, when using a hard decoder the preferred embodiment comprises the steps of:

(a) receiving an OFDM frame including a preamble comprising a pre-defined, number of preamble symbols arranged to form a known preamble code-word, (b) cross-correlating 84 successive pairs of symbols in the received frame to produce a cross-correlation output;

(c) converting the cross-correlation output into a binary sequence;

(d) selecting a first number of consecutive bits from the binary sequence, wherein the selected number matches the number of preamble symbols;

(e) selecting from a plurality of predefined code-words, the codeword which most closely matches the selected number of bits;

(f) comparing 90 the selected code-word against the preamble code-word (g) deciding 92 that synchronisation has been achieved in the event the selected code-word substantially matches the preamble code-word; and (h) performing, in the event the selected code-word does not substantially match the preamble code-word, the steps of:

(i) acquiring an additional symbol;

(j) cross-correlating the additional symbol with the immediately preceding received symbol to produce a cross-correlation value;

(k) converting the cross-correlation value into a first binary value;

(l) concatenating the first binary value to the binary sequence;

(m) removing the opposing binary value from the binary sequence; and (n) repeating steps (e) to (m) until a predefined stopping criterion (e.g. synchronisation) is achieved.

It will of course be understood that a soft decoder could also be used for analysing the cross-correlation values. In particular, a soft decoder acts directly on the cross-correlation values (to produce a decoded codeword), without needing the cross-correlation values to be translated into a binary sequence.

Whilst the preferred embodiment has been described with reference to the placement of a preamble at the start of an OFDM frame, it should be realised that the code-words in the preferred embodiment could also be placed at the end of an OFDM. In particular, the relative placement of the preamble is unimportant as long as the relative placement is established in advance and that placement is unchanged.

The description of the preferred embodiment has focussed so far on the use of cyclic codes, as these are easier to implement, since it is not necessary to find the specific code with which the preamble has been embedded. In particular, if another code is detected, which, is known to be, for example, two steps (or cyclic iterations) away from the desired code, then it is un-necessary to perform further DFT and cross-correlation operation, because the relevant start point of the OFDM frame is similarly two positions away. Nonetheless, it will be understood that the preferred embodiment is not limited to the use of cyclic codes. In particular, the preferred embodiment can employ any other binary error correcting code. However, whilst it is realized that other codes may have more powerful correcting capabilities, nonetheless, these codes typically have more complex implementations.

Alterations and modifications may be made to the above, without departing from the scope of the invention.

The invention claimed is:

1. A method for synchronizing a receiver with at least one OFDM frame comprising:

(a) receiving an OFDM frame that includes a preamble comprising a number of preamble symbols arranged to form a preamble code-word;

(b) cross-correlating successive pairs of symbols in the received OFDM frame to produce a cross-correlation output;

(c) selecting from a plurality of predefined code-words, a code-word that most closely matches cross correlation values of the cross-correlation output;

(d) comparing the selected code-word with the preamble code-word;

(e) deciding that synchronization has been achieved in the event the selected code-word substantially matches the preamble code-word; and (f) in the event the selected code-word does not substantially match the preamble code-word:

acquiring an additional symbol;
cross-correlating the additional symbol with the immediately preceding received symbol to produce a further cross-correlation value;
concatenating the further cross-correlation value to the cross-correlation output;
removing at least one opposing cross-correlation value from the cross-correlation output; and
repeating (c) to (f) until a predefined stopping criterion is achieved.

2. The method of claim 1, wherein selecting from a plurality of predefined code-words, a code-word that most closely matches cross-correlation values of the cross-correlation output comprises:
converting the cross-correlation output into a binary sequence;
selecting a number of consecutive bits from the binary sequence, the number matching the number of preamble symbols; and
selecting from a plurality of predefined code-words, a code-word that most closely matches the selected number of consecutive bits; and
concatenating the further cross-correlation value to the cross-correlation output and removing at least one opposing cross-correlation value from the cross-correlation output comprise:
converting the cross-correlation value into a first binary value;
concatenating the first binary value to the binary sequence; and
removing the opposing binary value from the binary sequence.

3. The method of claim 1, wherein receiving an OFDM frame, wherein the preamble comprises a structure constructed by:
producing a first plurality of short symbols of the same sign;
producing a second plurality of short symbols whose signs are set such that a one or more cross-correlations of the one or more pairs of each consecutive short symbol produces a pre-selected error correcting code-word; and
concatenating the first and second plurality of short symbols to form a preamble.

4. The method of claim 3 wherein producing a second plurality of short symbols comprises:
producing a third plurality of short symbols of the same sign;
selecting a binary error correcting code-word with substantially the same number of bits as the number of short symbols in the third plurality of short symbols of the same sign;
using the first short symbol in the third plurality of short symbols of the same sign to form the first short symbol in the second plurality of short symbols;
setting the sign of the first short symbol in the second plurality of short symbols to substantially match that of the first bit in the selected code-word;
using the next short symbol in the third plurality to form the next short symbol in the second plurality of short symbols;
setting the sign of this next short symbol in the second plurality to substantially match that of the corresponding bit in the selected code-word multiplied by the sign of the previous short symbol in the second plurality; and
repeating using the next short symbol and setting the sign of this next short symbol until the second plurality of short symbols is completed.

5. The method of claim 1 wherein selecting from a plurality of predefined code-words, comprises selecting from a plurality of predefined cyclic code-words.

6. The method of claim 1, wherein the OFDM frame comprises a structure consistent with at least one Wireless Local Area Network (WLAN) communication protocol standard.

7. The method of claim 1, wherein the OFDM frame comprises a structure consistent with at least one Power Line Communication (PLC) protocol standard.

8. The method of claim 1, wherein the preamble code-word comprises a plurality of short preamble symbols and at least one long preamble symbol.

9. A method for synchronizing a receiver with at least one OFDM frame comprising:
(a) receiving an OFDM frame that includes a preamble comprising a number of preamble symbols arranged to form a preamble code-word;
(b) cross-correlating successive pairs of symbols in the received OFDM frame to produce a cross-correlation output;
(c) selecting from a plurality of predefined code-words, a code-word that substantially matches cross correlation values of the cross-correlation output;
(d) comparing the selected code-word with the preamble code-word; and
(e) deciding that synchronization has been achieved in the event the selected code-word substantially matches the preamble code-word.

10. The method of claim 9, further comprising, in the event the selected code-word does not substantially match the preamble code-word:
acquiring an additional symbol;
cross-correlating the additional symbol with the immediately preceding received symbol to produce a further cross-correlation value;
concatenating the further cross-correlation value to the cross-correlation output;
removing at least one opposing cross-correlation value from the cross-correlation output;
selecting from a plurality of predefined code-words, a code-word that substantially matches cross correlation values of the cross-correlation output;
comparing the selected code-word with the preamble code-word; and
deciding that synchronization has been achieved in the event the selected code-word substantially matches the preamble code-word.

11. The method of claim 10, wherein selecting from a plurality of predefined code-words, a code-word that most closely matches cross-correlation values of the cross-correlation output comprises:
converting the cross-correlation output into a binary sequence;
selecting a number of consecutive bits from the binary sequence, the number matching the number of preamble symbols; and
selecting from a plurality of predefined code-words, a code-word that most closely matches the selected number of consecutive bits; and
concatenating the further cross-correlation value to the cross-correlation output and removing at least one opposing cross-correlation value from the cross-correlation output comprise:
converting the cross-correlation value into a first binary value;
concatenating the first binary value to the binary sequence; and removing the opposing binary value from the binary sequence.

12. The method of claim 9, wherein receiving an OFDM frame, wherein the preamble comprises a structure constructed by:
producing a first plurality of short symbols of the same sign;
producing a second plurality of short symbols whose signs are set such that a one or more cross-correlations of the one or more pairs of each consecutive short symbol produces a pre-selected error correcting code-word; and
concatenating the first and second plurality of short symbols to form a preamble.

13. The method of claim 12, wherein producing a second plurality of short symbols comprises:
producing a third plurality of short symbols of the same sign;
selecting a binary error correcting code-word with substantially the same number of bits as the number of short symbols in the third plurality of short symbols of the same sign;
using the first short symbol in the third plurality of short symbols of the same sign to form the first short symbol in the second plurality of short symbols;
setting the sign of the first short symbol in the second plurality of short symbols to substantially match that of the first bit in the selected code-word;
using the next short symbol in the third plurality to form the next short symbol in the second plurality of short symbols;
setting the sign of this next short symbol in the second plurality to substantially match that of the corresponding bit in the selected code-word multiplied by the sign of the previous short symbol in the second plurality; and
repeating using the next short symbol and setting the sign of this next short symbol until the second plurality of short symbols is completed.

14. The method of claim 9 wherein selecting from a plurality of predefined code-words, comprises selecting from a plurality of predefined cyclic code-words.

15. The method of claim 9, wherein the OFDM frame comprises a structure consistent with at least one Wireless Local Area Network (WLAN) communication protocol standard.

16. The method of claim 9, wherein the OFDM frame comprises a structure consistent with at least one Power Line Communication (PLC) protocol standard.

17. The method of claim 9, wherein the preamble code-word comprises a plurality of short preamble symbols and at least one long preamble symbol.

18. A receiver for receiving at least one OFDM frame comprising:
an input configured to receive an OFDM frame that includes a preamble comprising a number of preamble symbols arranged to form a preamble code-word;
a cross-correlator configured to cross-correlate successive pairs of symbols in the received OFDM frame to produce a cross-correlation output;
a decoder configured to:
select from a plurality of predefined code-words, a code-word that substantially matches cross correlation values of the cross-correlation output;
compare the selected code-word with the preamble code-word; and
decide that synchronization has been achieved in the event the selected code-word substantially matches the preamble code-word.

19. The receiver of claim 18, wherein, in the event the selected code-word does not substantially match the preamble code-word:
the input is configured to acquire an additional symbol; and
the cross-correlator is configured to:
cross-correlate the additional symbol with the immediately preceding received symbol to produce a further cross-correlation value;
concatenate the further cross-correlation value to the cross-correlation output;
remove at least one opposing cross-correlation value from the cross-correlation output;
select from a plurality of predefined code-words, a code-word that substantially matches cross correlation values of the cross-correlation output;
compare the selected code-word with the preamble code-word; and
decide that synchronization has been achieved in the event the selected code-word substantially matches the preamble code-word.

20. The method of claim 10, wherein in selecting from a plurality of predefined code-words, a code-word that most closely matches cross-correlation values of the cross-correlation output, the cross-correlator is configured to:
convert the cross-correlation output into a binary sequence;
select a number of consecutive bits from the binary sequence, the number matching the number of preamble symbols; and
select from a plurality of predefined code-words, a code-word that most closely matches the selected number of consecutive bits; and
concatenate the further cross-correlation value to the cross-correlation output and removing at least one opposing cross-correlation value from the cross-correlation output comprise:
convert the cross-correlation value into a first binary value;
concatenate the first binary value to the binary sequence; and
remove the opposing binary value from the binary sequence.

\* \* \* \* \*